Aug. 6, 1968  J. J. MULQUIN  3,395,880
METHOD FOR WINCH-CONTROLLED PARACHUTE
DELIVERY FROM AIRCRAFT
Filed Aug. 31, 1966  3 Sheets-Sheet 1
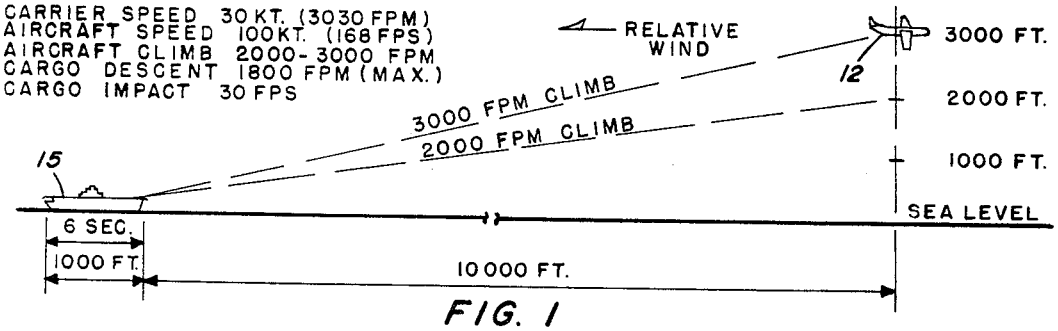
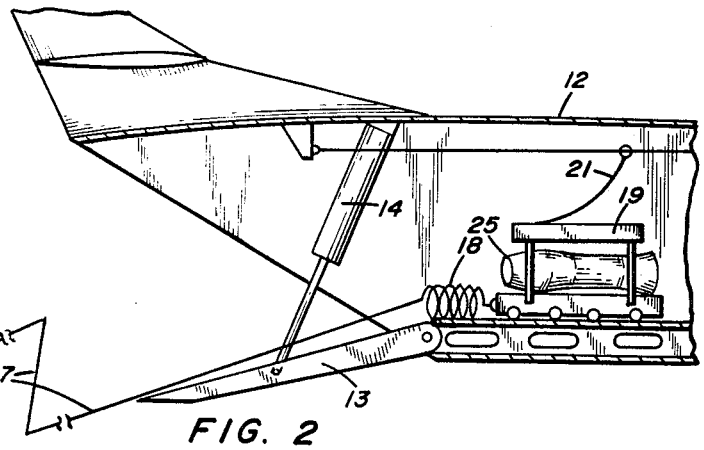
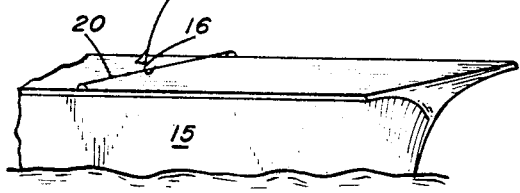
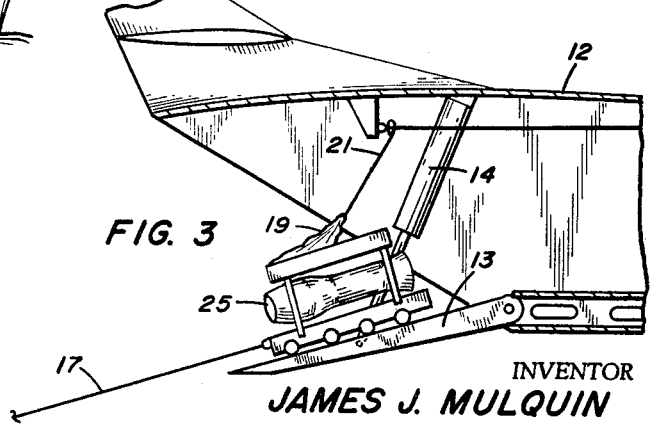
INVENTOR
JAMES J. MULQUIN
BY
ATTORNEY

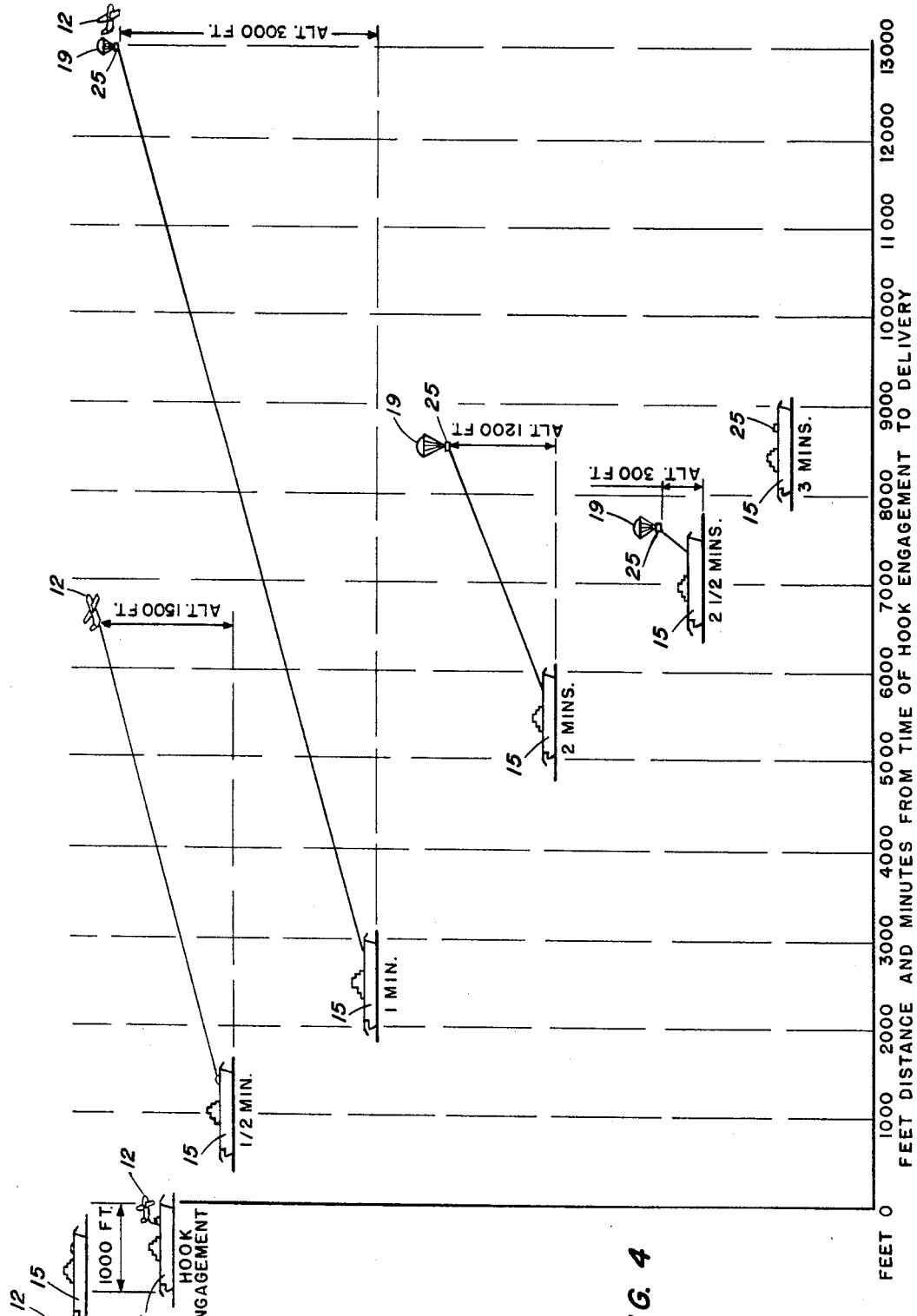

United States Patent Office 3,395,880
Patented Aug. 6, 1968

3,395,880
METHOD FOR WINCH-CONTROLLED PARACHUTE DELIVERY FROM AIRCRAFT
James J. Mulquin, 5101 Brentford Drive,
Rockville, Md. 20853
Filed Aug. 31, 1966, Ser. No. 576,805
2 Claims. (Cl. 244—137)

ABSTRACT OF THE DISCLOSURE

A method of delivering cargo from planes where a ground line picked up by the plane is attached to the cargo and is reeled in to guide the parachute supported cargo to its destination.

This invention relates to a method and apparatus for delivering cargo from an aircraft to a specific point and is more particularly adaptable for delivering heavy loads to a carrier while at sea and under way.

Heretofore delivery of heavy cargo to a carrier at sea is generally made from another ship and that ship is many knots slower than the carrier. To slow the carrier to the other ship's speed is dangerous as this would leave the carrier open to attack from submarines. Also the handling of heavy cargo at sea is a dangerous and undesirable task as well as time consuming. The result of the dangers and undesirability of delivering cargo from a ship at sea to a carrier has been that the carrier is ordered into dock and there loaded. This limits the use of the carrier and shortens its periods of activity. With nuclear power, carriers no longer need to periodically return to port as often and the need for a better way to deliver cargo, particularly heavy cargo like jet engines or replacement parts is desirable. The obvious way is to deliver by means of cargo carrying aircraft, but with the landing of heavy equipment in the water and the recovery from the water, the same problems of speed and the vulnerability to submarines arise. There is a need of apparatus and method which will deliver the cargo directly to the deck of a ship, without the necessity of slowing the carrier.

The object of this invention is to provide a method by means of which a heavy cargo can be delivered to the deck of a moving ship from an aircraft, with certainty and without damage to the cargo.

Another object of the present invention is to provide a method and apparatus by means of which a cargo can be delivered from an aircraft to any particular point, on the ground surface as a small clearing in a forest or jungle, a narrow strip of beach where delivery into the surf would result in a loss of cargo, or to the deck of a ship.

A further object of the present invention is to provide a cargo delivery system by means of which a heavy cargo, weighing thousands of pounds, may be delivered to a moving ship with certainty of delivery to the deck of the ship.

It is a still further object of the present invention to provide a system of cargo delivery, the use of which will enable ships, particularly carriers, to remain at sea for extended periods of time, and to receive said cargo without falling below the normal cruising speed.

The invention is illustrated in the accompanying drawings, in which:

FIG. 1 is a diagram showing and listing the different speeds of the aircraft and the carrier, as well as the descent of the cargo.

FIG. 2 is a view showing the relationship of the aircraft to the carrier just after the tether is hooked and details the cargo portion of the aircraft.

FIG. 3 shows the aft end of the aircraft at the period of jettisoning the cargo.

FIG. 4 is a diagram showing the relative positions of the carrier, the aircraft and the cargo, at different intervals during the delivery period.

Figure 5:
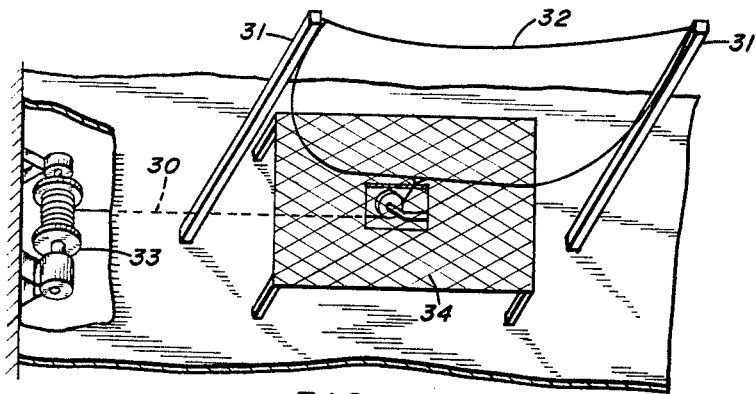
FIG. 5 is a diagrammatic showing of a rigged hook catcher and a cargo receiving net for use other than on a carrier.

Referring to FIG. 1, the diagram shows the carrier proceeding at speed of approximately 30 knots, with the aircraft, about one minute from the time at which the tether was caught by the carrier. The aircraft has proceeded about 10,000 feet upwind from the carrier and climbed to about 3,000 feet. At this point the cargo is jettisoned and falls about 1,800 feet per minute. With the aircraft proceeding about 3,000 feet per minute, it will be easily seen that at the end of fall of the cargo the aircraft is approximately under the spot at which the cargo was jettisoned. The tether has only to be held in tension to guide the falling cargo to the deck of the carrier. This distance is calculated to conform to the wind and the rate of fall of the parachuted supported cargo so that the tether is mainly used for lateral guidance.

The mechanics of this system may be carried out in many different ways, in the jungle, on a narrow strip of beach or to the deck of a ship. The approach to the landing of a cargo on a ship's deck is specifically set forth in FIGS. 2, 3 and 4.

A cargo aircraft 12 formed with a rear door 13 controlled through hydraulic mechanism 14 flies close enough to the deck of a carrier 15 to engage a hook 16 with a pendant 20 normally carried on the carrier's deck. The hook carried at the end of a tether 17 unwinds the tether from a coil 18 within the aircraft causing the tether to pay out to a predetermined length, at which time a jettisoning mechanism (no shown) propels the cargo 25 with its attached parachute 19 through the rear door of the aircraft. A static line 21 attached to the parachute opens the chute and the cargo starts downward.

On the ship a line wound on a power driven winch is secured to the hook 16 and with the jettisoning of the cargo is reeled upon the winch to tension the tether and and guide the descending cargo to the deck of the ship where it may be received upon some absorbing element (not shown) or permitted to hit the deck. Loads of 8000 pounds, approximately the weight of an engine replacement may be handled in this manner without the necessity of slowing the carrier under the usual cruising speed of approximately 30 knots.

Referring particularly to FIG. 4, a diagrammatic showing of different periods in the system is illustrated. The upper left figure shows the approach of the plane to the carrier previously to engaging the hook into the pendant. The second figure shows the engagement of the hook with the pendant and the start of the timing period. At the end of ½ minute the aircraft has climbed to 1500 feet and is approximately 5000 feet upwind of the carrier. After one minute the aircraft is approximately 3000 feet high and approximately 10,000 feet upwind, at which point the cargo is jettisoned. At the end of the second minute the cargo is approximately one-half way down and being guided by the tensioned tether to the deck of the carrier. After approximately three minutes, the cargo which has been influenced in its descent both by the wind and the tether has landed on the deck of the carrier, the entire operation being accomplished within less than five minutes and without the need to slow the carrier.

Figure 6:
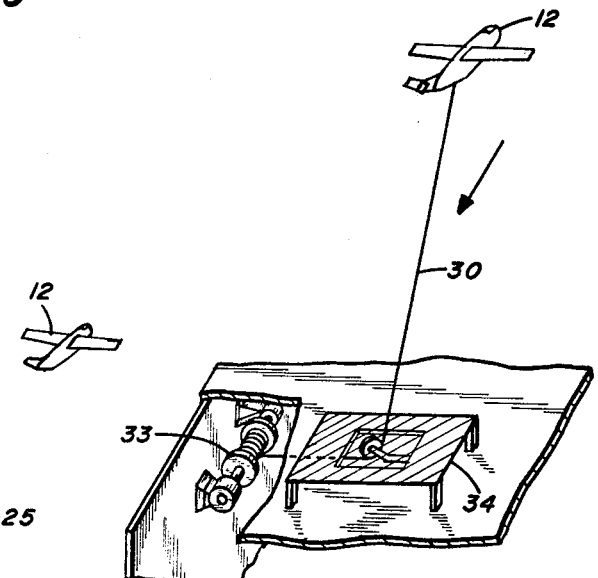
FIG. 6 shows a slightly different adaption of the apparatus shown in FIG. 5.
Figure 7:
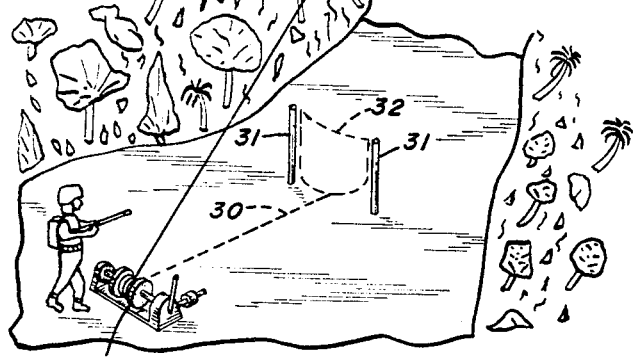
FIG. 7 is a diagrammatic representation of the descent of the cargo into a jungle clearing.

FIGS. 5, 6 and 7 show an alternate use of the system for delivery to inaccessible places. A pair of poles 31 supporting a cable 32 may catch the hook attached to the tether 33. The hook may be immediately attached to a power winch 33 through line 30 and, after the cargo is jettisoned, the winch may wind in the tether to guide the parachuted cargo to a landing net 34. In this manner cargo may be pinpoint landed to avoid loss of cargo in the surf when the landing is made on a narrow beach, or in the trees when landing is made in a small jungle clearing.

The system could be adapted for the delivery of small light weight packages such as mail to lightships or other out of the way stations, landing the cargo with certainty of recovery.

What is claimed is:

1. A method of parachute supported cargo delivery from an aircraft to a specific destination comprising:
   catching and restraining one end of a tether, originating from the aircraft, at the destination, the other end of said tether being attached to the cargo;
   paying out the tether from the aircraft while climbing to a predetermined height and windward distance from the specific destination;
   jettisoning the cargo with attached parachute from the aircraft after reaching predetermined height;
   attaching the restrained end of the tether to a power operated winding mechanism while the aircraft is climbing to a predetermined position to windward of the cargo's destination;
   winding in the tether after jettisoning the cargo to produce sufficient tension, substantially in the direction of fall, in the tether to guide the descending parachuted supported cargo to the specific destination.

2. A method of cargo delivery according to claim 1 and adding the step of receiving the cargo on a shock absorbing unit.

References Cited

UNITED STATES PATENTS

| | | | |
|---|---|---|---|
| 3,030,078 | 4/1962 | Daniels | 258—1.2 |
| 3,276,729 | 10/1966 | Jacobs | 244—137 |
| 3,323,762 | 6/1967 | Mylrea | 244—138 |

FOREIGN PATENTS

| | | |
|---|---|---|
| 279,054 | 9/1912 | Germany. |

MILTON BUCHLER, *Primary Examiner.*

T. W. BUCKMAN, *Assistant Examiner.*